United States Patent [19]
Schott

[11] Patent Number: 5,178,656
[45] Date of Patent: Jan. 12, 1993

[54] SOLID PARTICLE SEPARATOR FOR GAS FLOWS LOADED WITH SOLID PARTICLES

[75] Inventor: Hans-Klaus Schott, Dinslaken, Fed. Rep. of Germany

[73] Assignee: Kuettner GmbH & Co. K.G., Essen, Fed. Rep. of Germany

[21] Appl. No.: 745,462

[22] Filed: Aug. 14, 1991

[30] Foreign Application Priority Data

Aug. 15, 1990 [DE] Fed. Rep. of Germany ....... 4026171

[51] Int. Cl.⁵ .............................................. B01D 45/16
[52] U.S. Cl. ........................................ 55/450; 55/457; 55/463
[58] Field of Search .......................... 55/450, 455–457, 55/463

[56] References Cited

U.S. PATENT DOCUMENTS

| | | | |
|---|---|---|---|
| 2,192,214 | 3/1940 | Weir | 55/456 X |
| 2,664,966 | 1/1954 | Moore | 55/456 X |
| 2,806,551 | 9/1957 | Heinrich | 55/456 X |
| 3,394,533 | 7/1968 | Li et al. | 55/456 X |
| 3,407,575 | 10/1968 | Krizman | 55/456 X |
| 3,478,494 | 11/1969 | Lustenader et al. | 55/450 X |
| 3,546,854 | 12/1970 | Muller | 55/455 |
| 3,703,800 | 11/1972 | Courbon | 55/457 X |
| 4,179,273 | 12/1979 | Montusi | 55/457 |
| 4,255,174 | 3/1981 | Simpson | 55/457 X |
| 4,311,494 | 1/1982 | Conner et al. | 55/457 X |

FOREIGN PATENT DOCUMENTS 1607660 1/1972 Fed. Rep. of Germany ........ 55/457

Primary Examiner—Robert Spitzer
Attorney, Agent, or Firm—Kenyon & Kenyon

[57] ABSTRACT

A device for the separation of solid particles from a gas flow that is loaded with solid particles, particularly for the separation of coarsely grained solid particles, includes a housing through which the gas flow to be cleaned has to pass and a discharge opening for the solid particles. A generally dynamically balanced guidance and torsion element is disposed within the housing a specifiable distance from the inner wall of the housing. A submerged tube is disposed on the discharge end of the housing. The torsion element has at least one spiral-shaped helical element on its outer side which imparts a rotational directionality to the gas flow that is loaded with solid particles about a symmetry axis of the separator.

21 Claims, 1 Drawing Sheet

SOLID PARTICLE SEPARATOR FOR GAS FLOWS LOADED WITH SOLID PARTICLES

BACKGROUND OF THE INVENTION

The invention concerns a device for the separation of solid particles from a gas flow that is loaded with solid particles. In particular for the removal and separation of coarsely grained solid particles, with a housing through which the gas flow has to pass and which is provided with a discharge opening for solid particles and in which a generally dynamically balanced guidance and torsion element is arranged within a distance to the inner wall of the housing and which is also provided with a submerged tube at the discharge opening.

Gas flows that are loaded with solid particles frequently occur in various situations, particularly in the technology of mechanical processing, in which the size of the solid particles can include an extensive range of grain sizes. Gas flows of this sort cannot be discharged into the environment without first being cleaned for ecological reasons. Additionally, at least a substantial part of the solid particles (specifically, those that are coarsely grained) can be reused as a raw material, if they could be separated and removed from the gas flow.

Particularly in areas of heat technology, a frequent problem is that subsequently arranged components of the facility such as furnace chambers, heat exchangers, filters and similar devices, should be protected from sludge (so-called fouling). Furthermore, the effectiveness of the resulting heat transfer steadily decreases. One application of this sort is the port-end of a cupola.

Another technologically similar example is the exhaust flow from processing plants in foundries or for foundry dust removal facilities. In these situations the exhaust gas flow contains a finely grained portion having a particle size of less than 90 microns as well as a considerable portion of coarsely grained particles having particle sizes greater than 100 microns. These particles can be reused in an economically advantageous manner by removing them from the exhaust gas flow and separating the finely grained portion, thus simultaneously reducing the quantity of solid particles that must be deposited in waste sites.

It is known that the dust created in blast furnaces, cupolas and steel processing facilities contain harmful materials, such as alkalis, Zn and Pb, particularly in the finely grained portion (e.g., those particles having a grain size from 0 to approximately 70 microns), while the coarsely grained portion having larger particle sizes contains less harmful materials and is considerably easier to process and reuse after it is separated from the finely grained portion.

So-called cyclones are known for separating solid particles from gas flows, which essentially include a generally dynamically balanced container with a vertical axis of symmetry into which the gas flow to be cleaned is introduced in a generally tangential manner so that the gas flow rotates about the vertical longitudinal or symmetry axis. The gas flows upward with a more or less helical-shape around the rotation axis in the cyclone. Separation of the solid particles results from the deceleration caused by the surface friction of the wall. The particles are discharged from the lower end section of the cyclone through a solid particle discharge opening, while the cleaned gas flow is discharged from the cyclone through a gas discharge opening on the top. Such cyclones not only require considerable space, particularly with respect to their height requirements, but are also relatively demanding. Furthermore, they are usually not able to separate certain grain fractions, which can be very advantageous in many cases for the reasons indicated above.

Another known separation device is a so-called spark separator, which in construction corresponds to the present invention, but such a separator does not at all fulfill the demands placed upon it. In particular, the known spark separators do not have an adjustable rotation speed nor can they vary the particle size to be separated.

The known separation elements work within relatively rigid limitations with respect to their operational parameters, and hence a change in the gas quantity and/or the gas temperature, as well as the dust content of the gas, can lead to different separation efficiencies and change the separation efficiency curve with regard to its steepness and average particle size.

For certain technological applications, for example when the separator is placed behind the port-end of a cupola, it is advantageous if the separation efficiency does not considerably vary upon changes of the operational parameters.

The problem with the prior art is that there is no separator of the type described above for separating certain grain fractions, particularly coarsely grained fractions, from a gas flow loaded with harmful materials in order to process and further use these materials, which is well-suited to be used under different pressure and temperature conditions, as well as with different gas amounts and different loads of solid particles in the gas while causing the least possible pressure loss and which can be produced in an economical manner and subsequently installed in already existing facilities and, particularly in relation to the cyclones, have a relatively low structural height.

SUMMARY OF THE INVENTION

The present invention provides a device for separating solid particles from a gas flow loaded with solid particles, and particularly for separating coarsely grained solid particles. The device includes a housing that has a discharge end, an expansion section through which the gas flow to be cleaned passes, and a discharge opening for the solid particles. A submerged tube is disposed on the discharge end of the housing. A generally dynamically balanced guidance and torsion element is disposed within the housing and positioned a distance from the inner wall of the housing that imparts a rotational directionality to the gas flow loaded with solid particles, resulting in centrifugal separation of the solid particles. The torsion element forms a truncated cone disposed within the expansion section of the housing, increasing solid particle separation with regard to grain size and steepness of a separation efficiency curve by the centrifugal forces by a dead space separation in a flow shadow of the submerged tube, whereby a mass of the gas flow and its load of solid particles do not directly effect the separation result.

In one embodiment of the invention, the torsion element has a plurality of helical elements.

It has been shown to be particularly advantageous if the housing is provided with an expansion section whose cross-sectional surface area expands in the flow direction so that it can influence the speed of the gas flow and thus its rotation, consequently improving the separation process.

A housing having a generally conical shape is not necessarily connected with a deceleration of the gas flow, because the torsion element in the separator is advantageously arranged within the expansion section and is generally constructed in the shape of a cone. Since the flow speed depends largely on the free flow crosssectional area, the flow speed can remain constant if a substantially conical torsion element is arranged in the expansion section of the housing. Thus, the gas flow can also be constant in the flow direction or, if it should be advantageous for certain reasons, it could even increase in the flow direction if the flow cross section decreases in the direction of flow because of the previously described geometric and/or constructive circumstances.

It is also advantageous if the submersion depth of the submerged tube is adjustable, because this seems to influence the grain size of the separated solid particles. It is surprising that a change in the submersion depth of the submerged tube in torsion separation processes superimposes a so-called "dead space separation" with the "wind shadow zone" that is created by the submerged tube by the abrupt reversal of the gas flow, and which has a decisive influence on the separated grain size and the steepness of the separation efficiency curve. It is also surprising that the separation results are generally not dependent on the mass of the gas flow and its load of solid particles.

The position of the torsion element can be adjusted relative to the housing in the direction of the longitudinal axis of symmetry so as to be able to optimally adapt the size of the free flow cross sectional area to the corresponding parameters discussed above.

DETAILED DESCRIPTION

Figure 1:
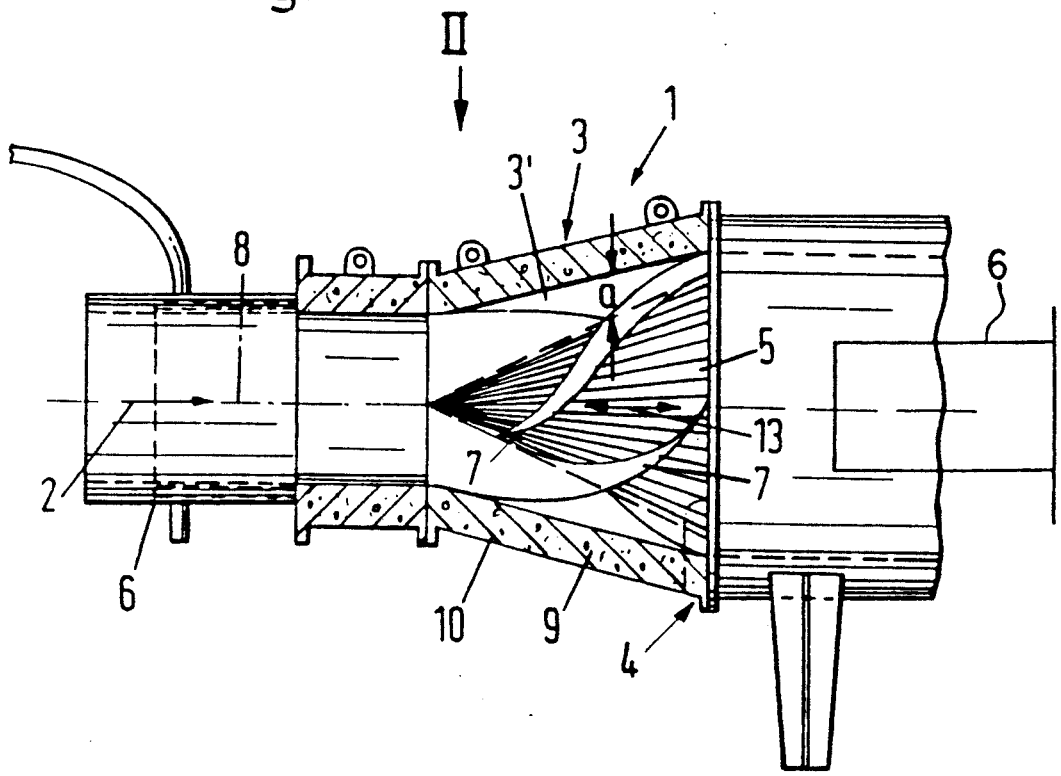
FIG. 1 shows a partial sectional view of the separator constructed according to the principles of the invention taken along the Line I—I in FIG. 2.
Figure 2:
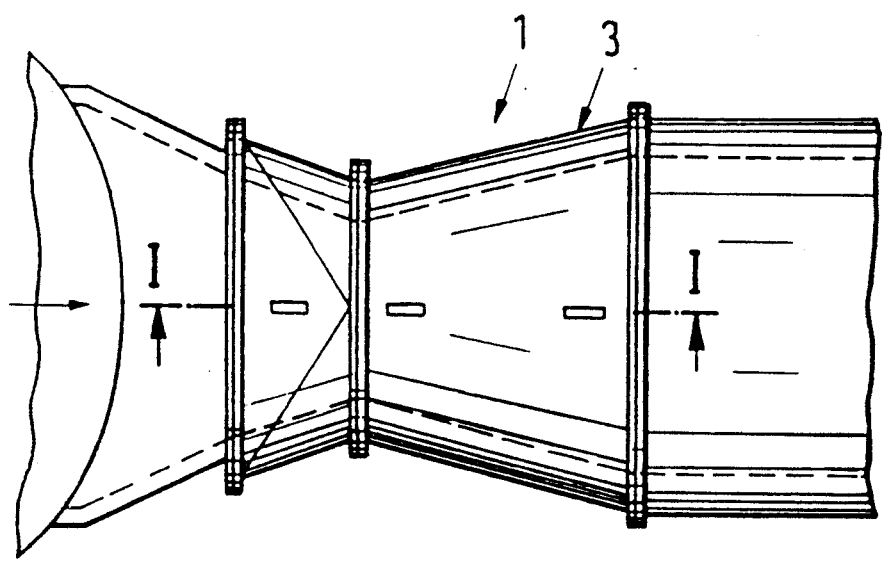
FIG. 2 shows a top view of the separator shown in FIG. 1.

The Figures show a separator for separating coarsely grained solid particles from a gas flow that is loaded with solid particles. As seen in FIG. 1, the gas flow is introduced into the separator 1 in the direction of the Arrow 2 and flows therethrough. The separator 1 has a housing 3, which has an end section containing a discharge opening (4) for the solid particles.

A generally dynamically balanced guidance and torsion element (5) is arranged in the housing (3). The guidance and torsion element 5 is positioned a distance a from the inner wall (3') of the housing (3). The distance is variable along the axis of the housing 3. The separator (1) also has a submerged tube (6) disposed at the end of the discharge opening.

As FIG. 1 illustrates, the torsion element (5) is constructed in the shape of a cone and has four spiral-shaped helical elements (7) on its outer side. The helical elements cause the gas flow that is loaded with solid particles to rotate about the symmetry axis (8) of the separator that generally extends horizontally. The helical elements (7) are in general spaced equal distances from one another on the torsion element (5).

The Figures also show that the housing (3) has an expansion section (9) in the shape of a truncated cone whose cross-sectional surface area increases in the flow direction (2). The expansion section (9) surrounds the torsion element (5). The position of the torsion element (5) is adjustable relative to the housing (3) in the direction of the symmetry axis (8). Likewise, the submersion depth of the submerged coil (6) can also be varied.

The interior side of the housing (3) is provided with a solid lining (10) so that the separator (1) can be used at elevated temperatures.

One example of an application for the present invention involves a cupola. The separator (1) is arranged behind the port-end of the cupola so that it can separate the coarsely grained portion (i.e., those particles greater than 100 microns) from the exhaust gas and reuse them after further processing that reduces the quantity of harmful materials that they contain.

Optimization of the separator 1 is achieved during startup by adjusting the torsion element 5 relative to the housing (3) along the direction of the double arrow (13), so that the free flow cross-sectional distance between the torsion element (5) and the inner wall (3') of the housing (3) can be adjusted, as can the submersion depth of the submerged tube (6).

I claim:

1. A device for separating solid particles from a gas flow loaded with solid particles, and particularly for separating coarsely grained solid particles, said device comprising:

a housing having a discharge end and an expansion section through which the gas flow to be cleaned passes and having a discharge opening for the solid particles;

a submerged tube disposed on the discharge end of said housing, said submerged tube having an adjustable submersion depth; and a generally dynamically balanced guidance and torsion element disposed within said housing and positioned a distance from the inner wall of the housing that imparts a rotational directionality to the gas flow loaded with solid particles resulting in centrifugal separation of the solid particles, said torsion element forming a truncated cone disposed within the expansion section of the housing which increases solid particle separation with regard to grand size and steepness of a separation efficiency curve by the centrifugal forces by a dead space separation in a flow shadow of the submerged tube, whereby a mass of the gas flow and its load of solid particles do not directly effect the separation result.

2. The device according to claim 1, wherein said torsion element has a plurality of helical elements.

3. The device according to claim 2, wherein said torsion element has at least one spiral-shaped helical element on its outer side imparting a rotational directionality to the gas flow that is loaded with solid particles about a symmetry axis of the separator.

4. The device according to claim 2 wherein said torsion element has four helical elements.

5. The device according to claim 4 wherein said helical elements are disposed at substantially the same distance from one another on the torsion element.

6. The device according to claim 5 wherein said expansion section of the housing has a cross-sectional surface area that increases in the direction of the gas flow.

7. The device according to claim 6 wherein said expansion section is shaped as a truncated cone.

8. The device according to claim 7 wherein said torsion element has a cross-sectional surface area that increases in the direction of the gas flow.

9. The device according to claim 6 wherein said torsion element has a cross-sectional surface area that increases in the direction of the gas flow.

10. The device according to claim 9 wherein the distance between an inner wall of the expansion section and an outer wall of the torsion element decreases in the direction of the gas flow.

11. The device according to claim 9 wherein the distance between an inner wall of the expansion section and an outer wall of the torsion element increases in the direction of the gas flow.

12. The device according to claim 11 wherein a symmetry axis of the separator extends in a substantially horizontal direction.

13. The device according to claim 12 wherein said torsion element is adjustable relative to said housing in the direction of the symmetry axis.

14. The device according to claim 13 wherein the inner side of said housing has an interior side having a fire-resistant lining or similar material.

15. The device according to claim 14 wherein said discharge opening for the solid particles is substantially perpendicular to said symmetry axis.

16. The device according to claim 2 wherein said helical elements are disposed at substantially the same distance from one another on the torsion element.

17. The device according to claim 1, wherein said torsion element has at least one spiral-shaped helical element on its outer side imparting a rotational directionality to the gas flow that is loaded with solid particles about a symmetry axis of the separator.

18. The device according to claim 17 wherein said torsion element has four helical elements.

19. The device according to claim 1 wherein the distance between an inner wall of the expansion section and an outer wall of the torsion element is constant in the direction of the gas flow.

20. The device according to claim 1 wherein the distance between an inner wall of the expansion section and an outer wall of the torsion element decreases in the direction of the gas flow.

21. The device according to claim 1 wherein the distance between an inner wall of the expansion section and an outer wall of the torsion element increases in the direction of the gas flow.

* * * * *

UNITED STATES PATENT AND TRADEMARK OFFICE
CERTIFICATE OF CORRECTION

PATENT NO. : 5,178,656            Page 1 of 2
DATED       : January 12, 1993
INVENTOR(S) : Hans-Klaus Schott It is certified that error appears in the above-indentified patent and that said Letters Patent is hereby corrected as shown below:

| Column | Line | |
|--------|------|---|
| 1 | 8 | Change "particles. In particular for" to --particles: in particular, for--. |
| 1 | 35 | After "situations" insert --,--. |
| 2 | 11 | After "speed" insert --,--. |
| 2 | 62 | Change "effect" to --affect--. |
| 3 | 9 | Change "crosssectional" to --cross-sectional--. |
| 3 | 14 | Change "cross section" to --cross-section-- |

UNITED STATES PATENT AND TRADEMARK OFFICE
CERTIFICATE OF CORRECTION

PATENT NO. : 5,178,656
DATED : January 12, 1993
INVENTOR(S) : Hans-Klaus Schott

It is certified that error appears in the above-indentified patent and that said Letters Patent is hereby corrected as shown below:

| Column | Line | |
|---|---|---|
| 3 | 34 | Change "cross sectional" to --cross-sectional--. |
| 3 | 45 | After "separator" insert --1--. |
| 3 | 65 | After "are" insert --,--; after "general" insert --,--. |
| 4 | 46 | Change "grand size" to --grain size--. |
| 4 | 50 | Change "effect" to --affect--. |
| 4 | 51 | After "claim 1" delete the comma. |
| 4 | 53 | After "claim 2" delete the comma. |

Signed and Sealed this

Sixteenth Day of November, 1993

Attest:

BRUCE LEHMAN

Attesting Officer

Commissioner of Patents and Trademarks